Feb. 11, 1930.　　　C. A. PIERCE　　　1,747,132
BEAD FORMING MACHINE
Filed March 15, 1928　　　3 Sheets-Sheet 3
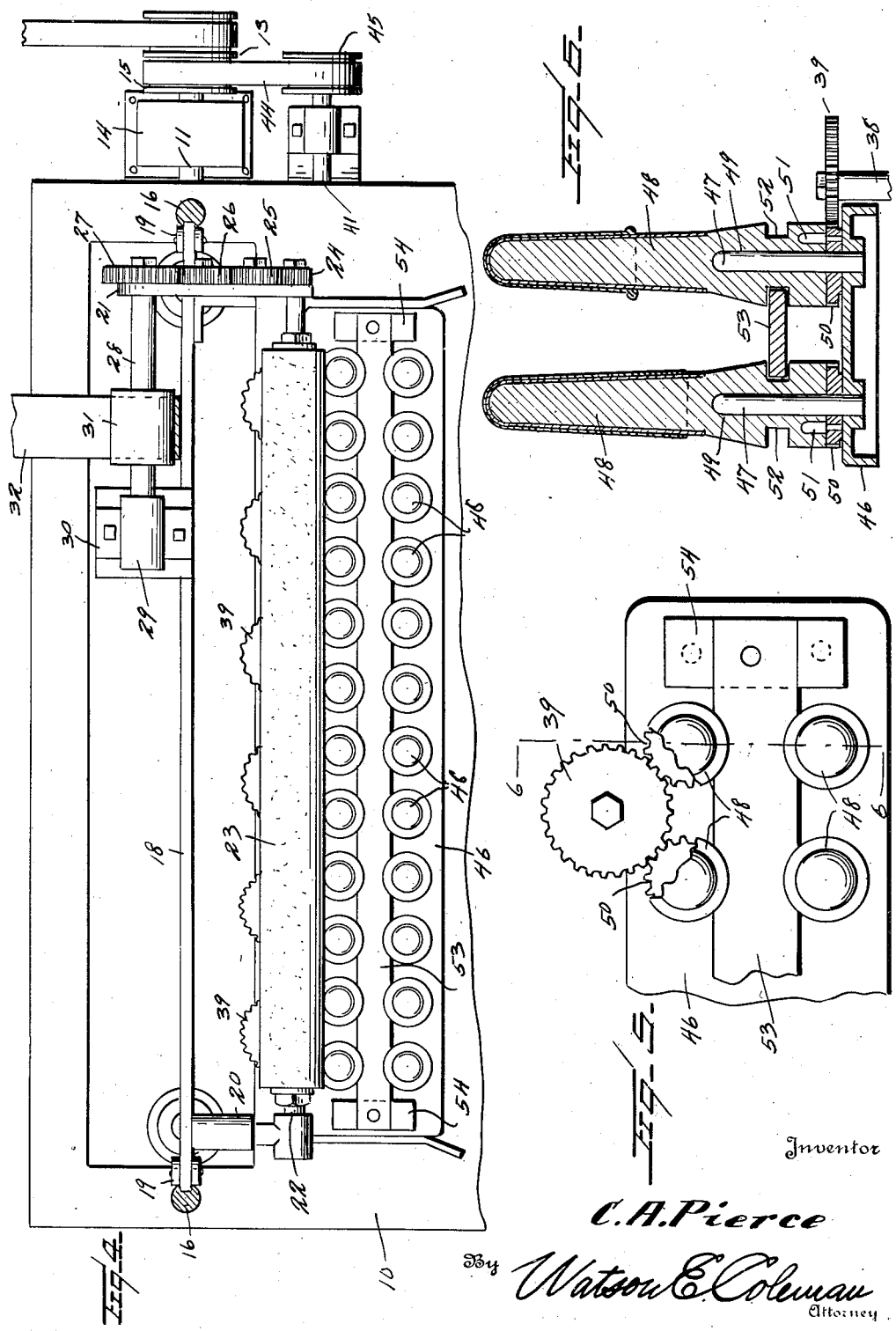

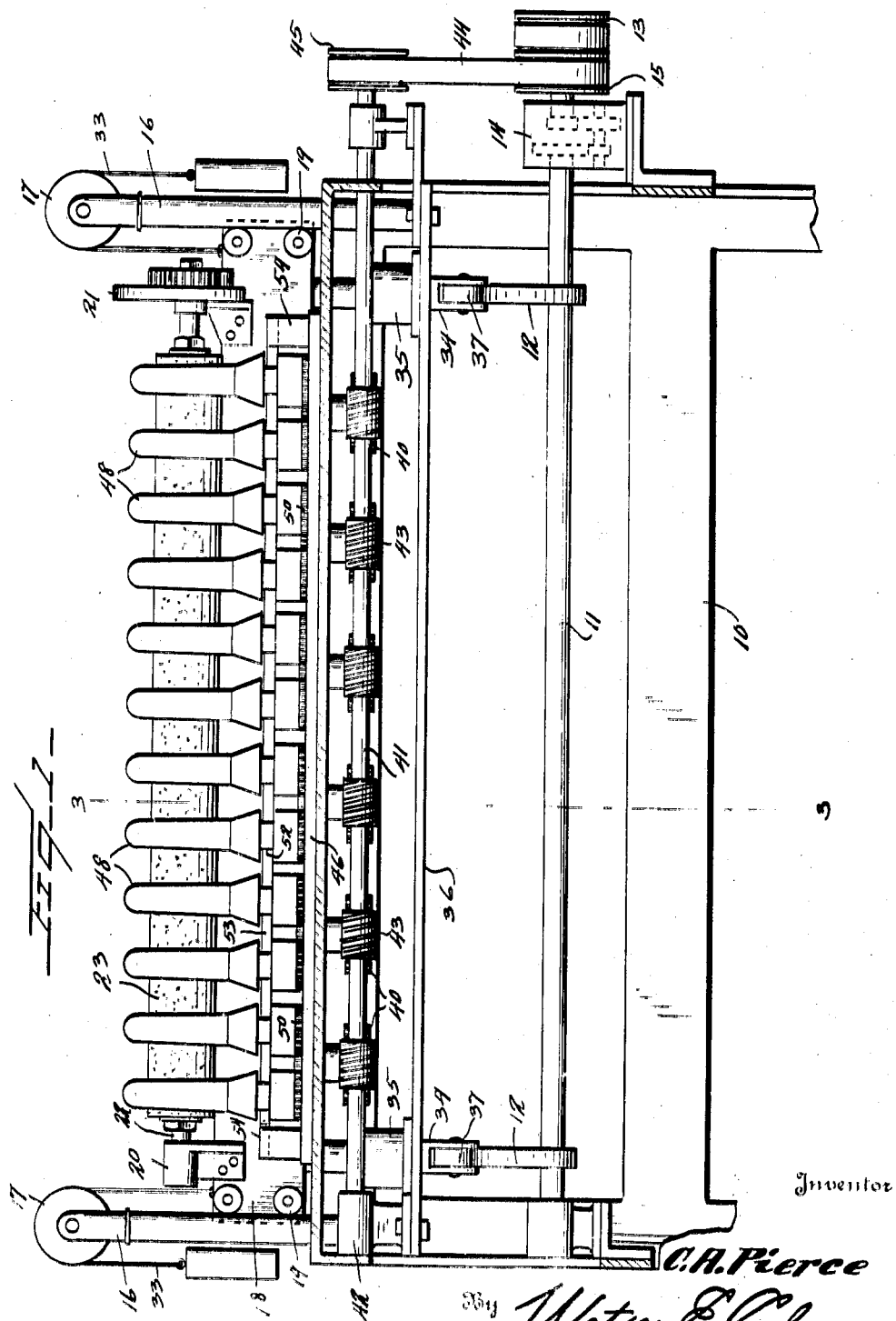

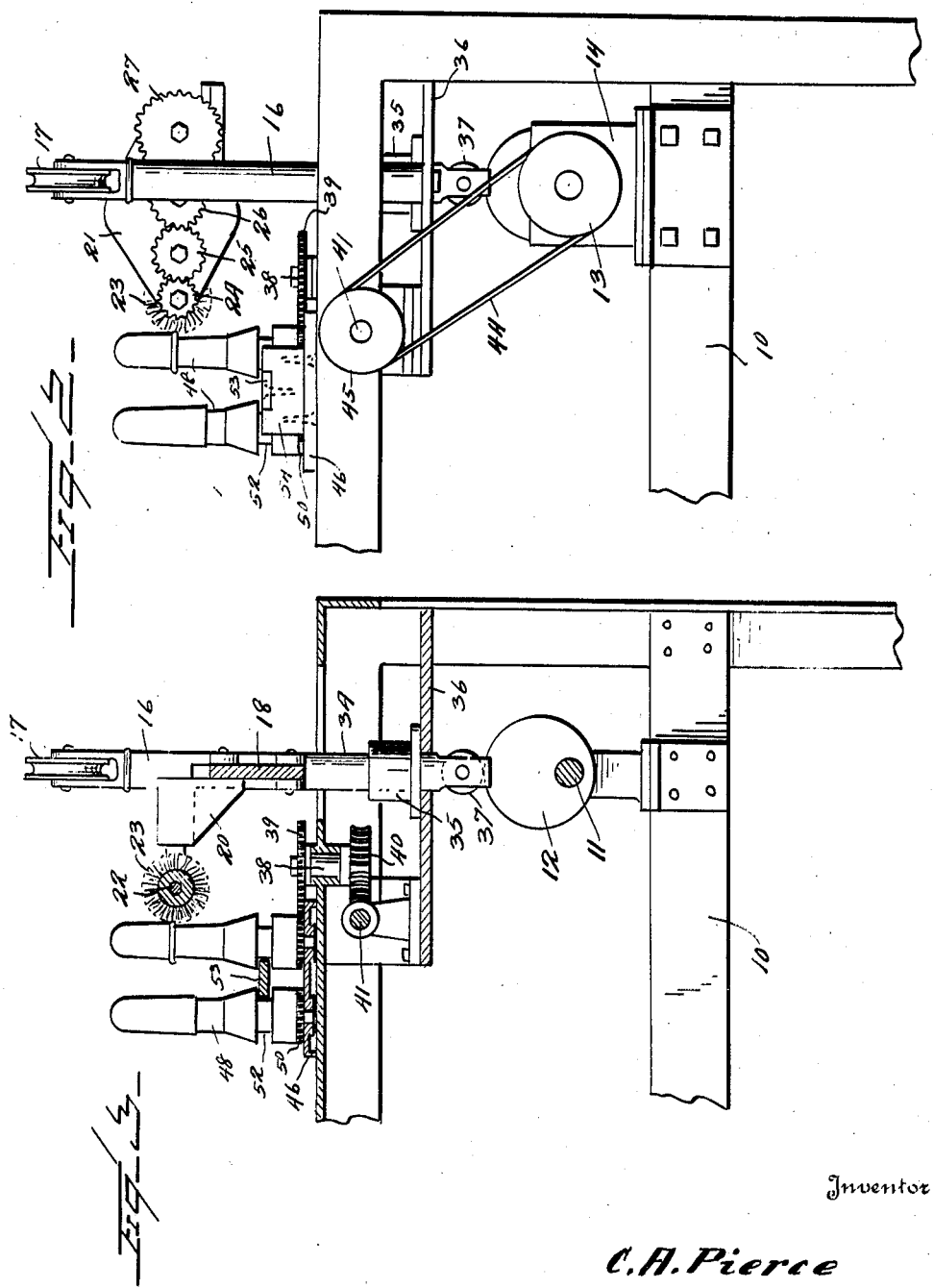

Patented Feb. 11, 1930

1,747,132

UNITED STATES PATENT OFFICE

CLIFFORD A. PIERCE, OF GLEN RIDGE, NEW JERSEY, ASSIGNOR TO EWING RUBBER CO., OF EWING, NEW JERSEY, A CORPORATION OF NEW JERSEY

BEAD-FORMING MACHINE

Application filed March 15, 1928. Serial No. 261,952.

This invention relates to machines for forming beads or rings upon finger cots and the like rubber articles.

In the formation of these articles, forms of wood, porcelain or glass are dipped in a prepared rubber solution. After sufficient rubber has been accumulated upon the form to make the article, the next step in the process is to form a bead upon the lower edge of the article. These beads are very largely made by hand and after the bead is formed, whether formed by hand or by machines, the articles upon the form are carried to the vulcanizing room and the vulcanizing or curing process is carried out, giving to the articles the necessary elasticity, strength and durability. After this has been accomplished, the articles are stripped from the form.

The present invention has to do entirely with the formation of the bead upon the articles prior to the deposit of the articles in the vulcanizing room, and the general object of the invention is the provision of a machine for this purpose so constructed that a large number of the articles may have the bead formed thereon while the articles are mounted upon the form.

A further object is to provide a device of this character which does not involve the use of an endless conveyor but in which the forms are mounted upon rotatable spindles carried upon a support and in which the support is manually placed in proper position within the bead-rolling machine and manually removed from this position.

A still further object is to provide a device of this character which includes a ring or bead-forming rotatable brush or roller mounted for vertical movement with relation to the forms, and means for causing a rotatation of the forms while the articles are in contact with the bead roller or brush, the bead roller being mounted for vertical movement under the control of the operator to cause the rolling up of the bead.

Another object is to provide a mechanism of this character which is very simple, by which a large output of work may be secured, and which is particularly compact.

Other objects will appear in the course of the following description.

My invention is illustrated in the accompanying drawings, wherein:—

Figure 1 is a front elevation of a bead forming machine constructed in accordance with my invention, the table being in section;

Figure 2 is a fragmentary end elevation of the bead forming machine;

Figure 3 is a section on the line 3—3 of Figure 1;

Figure 4 is a fragmentary top plan view of the bead forming machine;

Figure 5 is a fragmentary plan view of the form support and forms thereon, showing means for driving the forms;

Figure 6 is a section on the line 6—6 of Figure 5.

Referring to these drawings, it will be seen that I have provided a frame, designated generally 10, this frame supporting a shaft 11. This shaft carries a plurality of cams 12 and is driven in any suitable manner as, for instance, by the belt pulley 13. This shaft 11 passes through a casing 14 having therein reduction gearing (not shown) of any suitable character, this reduction gearing in turn being driven by the shaft of belt pulley 13.

Disposed at each end of the machine is an upwardly extending post or guide 16 having a pulley 17 at its upper end, and mounted for vertical movement upon these guides 16 is a longitudinally extending supporting member 18 having wheels 19 engaging the guides 16. Mounted in suitable supporting brackets 20 and 21 carried by this vertically movable supporting plate 18 is the brush shaft 22 carrying upon it the rotatable brush 23 which is elongated in the direction of the length of the machine. While I have illustrated a brush, it will be understood that I do not wish to be limited to this as under some circumstances a roller as, for instance, a roller of spongeous rubber or like material might be used. Preferably, however, I employ a brush.

The brush shaft 22, as shown in Figure 4, carries at one end the gear wheel 24 which engages with a gear wheel 25, in turn meshing with a gear wheel 26 and in turn meshing with a gear wheel 27. The gear wheels 25 and 26 are mounted upon stub shafts carried by the bracket 21. The gear wheel 27 is mounted upon a shaft 28, which at its other end is mounted in a bearing 29 carried by a supporting plate 30, and this shaft carries upon it the band wheel 31 by which power may be applied to rotate the brush. The band 32 extends rearward to any source of power, and it will be obvious that the brush and the brush driving gears may be raised or lowered while the gears are being continuously driven by means of the band 32.

Attached to the supporting plate 18 at each end are the cables 33 which pass over the pulleys 17 and are connected to weights which nearly but do not quite counterbalance the weight of the brush, its shaft, the plate 18 and the allied parts. Mounted upon the shaft 11 are the cams 12, as previously stated, and extending downward from the supporting plate 18 are rods 34 which extend downward through guides 35 on a plate 36 which forms part of the frame of the machine, these rods carrying at their lower ends rollers 37 which engage the cams 12. It will thus be seen that as the shaft 11 rotates the cams will act to lift up on the brush-supporting plate 18 and the brush and then allow the plate 18 with the brush to lower so that there will be a constant vertical reciprocation of the brush, while at the same time the brush is constantly rotating.

Mounted immediately below the brush are a plurality of vertical shafts 38 carrying a plurality of gear wheels 39, these wheels being disposed at spaced distances longitudinally of the machine and below the brush. The shaft 38 for each gear wheel carries upon it a worm wheel 40. Extending longitudinally of the machine is a worm shaft 41 mounted in bearings 42, which carries upon it a plurality of worms 43, each engaging one of the worm wheels 40. This shaft 41 is driven by a belt 44 extending over a drive wheel 45 mounted upon the shaft and passing over the driving pulley 15. It will be seen, therefore, that as the brush 23 rotates and vertically reciprocates, the gear wheels 39 will be continuously rotated.

To provide for the proper presentation of the forms to the brush so that the finger cots or other articles may have beads formed on their lower ends by the brush, I provide a form-carrying board 46 which is preferably of metal, though I do not wish to be limited to this, having the upwardly extending pins 47 at intervals. These pins are arranged in two parallel series and, as illustrated, there are two series of twelve each. The forms 48 may be of any suitable character but, as illustrated, are shown as if made of wood or with a wooden base, this base being enlarged at its lower end and having a central bore 49 adapted to receive the pin 47. The lower end of the base preferably has mounted in connection therewith a gear wheel 50, this gear wheel surrounding the pin 47 and being engaged with the lower end of the form by means of an upwardly projecting pin 51 extending up from the gear wheel into a vertical bore formed in the lower end or base of the form. The base of each form has an annular groove 52, and coacting with these grooves in the sets of forms is a longitudinally extending hold down strip 53. This is supported at its ends upon supporting members 54 engaged with the board or plate 46. This hold down strip 53 extends between the two series of rotatable forms and engages the grooves of both series of forms and thus acts to prevent the forms from dropping off of the board or being lifted up therefrom and will permit the board 46 being inverted without causing the forms to drop therefrom. This strip 53, of course, will not interfere with the free rotation of the forms.

The forms are so arranged upon the board 46 that when the board is disposed, as shown in Figures 1, 2, 3 and 4, upon the supporting table or frame of the machine, the wheels 50 will come in contact with the wheels 39 and the forms will be rotated at a relatively high rate of speed while they are being acted upon by the brush. It will be seen from Figure 4 that there is one of these wheels 39 to each two of the forms so that when the form-supporting board 46 is put in the position shown in Figure 4 by the operator, the wheels 39 will come in contact with two of the forms and rotate both of these forms in the same direction. Thus, for instance, I have illustrated a form-supporting board or plate having two sets of forms, there being twelve forms in each set. There are, therefore, six of the wheels 39 to engage the twelve forms. Preferably the wheels 39 are gear wheels and the wheels 50 mesh with these gear wheels, but I do not wish to be limited to this, as friction wheels might be used instead. Gear wheels, however, secure a more positive drive of the forms from the wheels 39 than could be secured by friction wheels.

In the use of this mechanism, the operator inserts the board 46 in the machine, that is, in the position shown in Figure 4, and forces the board 46 rearward, which brings one row of the forms into contact with the driving wheels 39. This causes the rotation of the forms at a high speed. The operator inserts the forms when the brush is in its lowered position and the brush immediately moves upward, and inasmuch as the forms are being rotated at a high speed and the brush is rotating in a clockwise direction, it follows that the lower edges of the finger cots or other articles, which are designated 55, will be rolled up to an extent depending upon the upward movement of the brush, that is, upon the stroke of the brush under the action of the cams 12. As soon as the brush has completed its upward stroke, the operator retracts the form board 46 and turns it around and again places it in position so as to carry the second row of forms into contact with the driving wheels 39 and the same operation is performed upon the second row of spindles or forms.

It is to be understood that an operator will take the filled forms from one side of the machine, roll the beads upon the articles on these forms, and then withdraw the form board and place it to the other side of the machine. The form boards can then be removed to the vulcanizing apparatus and the rubber articles vulcanized.

By having the stroke of the brush of sufficient length, that is, having the stroke of the brush practically equal to the length of the forms, this machine could be used for stripping the finger cots or other articles from the forms or spindles. It will be understood, however, that primarily this machine is designed for the purpose of forming beads or rings upon the lower ends of the articles and not for stripping.

A machine constructed in accordance with this invention is compact and an unskilled operator can very readily bead or ring, as it is termed, a very large number of articles a day. The mechanism does not involve the use of a conveyor but the boards supporting the article are simply slipped into place by the operator, that is, into position to bring the forms into contact with the driving gear wheels 39 and with the brush and then slipped out of place and shifted to one side. Thus in the absence of a conveyor, the machine may be made very compact without, however, in any way detracting from the rapidity with which the operation may be performed. By having the spindles or forms mounted upon supporting boards, a large number of forms may be dipped at one time and handled at one time.

While I have illustrated a particular embodiment of my invention, it is to be understood that the invention might be embodied in other forms without departing from the principle of the invention as defined in the appended claims. Thus, as before stated, I do not wish to be limited to the use of toothed gear wheels 39, as untoothed or friction gear wheels might be used, though preferably toothed wheels will be used for reasons stated in the last paragraph of this specification. Neither do I wish to be limited to the exact means illustrated for giving a reciprocating motion to the brush, as it is obvious that other means might be used for this purpose than that shown. Thus the cam might be used for lowering the brush and the weights be used for raising the brush or the cams 12 might be omitted and the brush be forced downward against the action of counterbalancing weights by an operator.

It will be noted particularly that the driving means in this mechanism does not directly engage the forms 48 but that it engages gear wheels 50, which in turn are detachably engaged with the forms through the pins 51. This construction permits the forms to be removed in case of the breakage of the glass or porcelain mold which is mounted upon the wooden base or form 48. In this case, it is very easy to remove the bar 53, lift off the wooden plug that contains the broken mold, and replace it with another mold. Furthermore, sometimes the wooden form may break and the glass mold still be in good condition, so it is an easy matter to remove the form from the gear, place the unbroken glass mold upon a new form, and re-insert the form in place.

By using a gear wheel 50 engaging the driving gear 39, I secure a positive movement of the forms, whereas were the forms frictionally engaged through the mediation of a friction wheel with a driving friction wheel taking the place of the gear 49, there would be a certain amount of slippage, and this is particularly true where the forms are mounted upon a form board and pushed into engagement with the driving wheels 39. Gear 39 is running only at a speed of approximately 60 to 70 R. P. M. and is twice the size of the gears 50, thus giving 120 R. P. M. to the forms after the gears are meshed. The gears mesh very readily even at a higher speed, as there is no trouble in bringing the gears 50 up to the gears 39 and these gears 50 turn so easily that they will mesh immediately.

I claim:—

1. A machine of the character described including a horizontally disposed, rotatable bead-forming brush, means for rotatably supporting a plurality of article forms in front of the brush with the articles in contact therewith and rotating the forms, and means for relatively moving the forms and brush vertically with relation to each other.

2. A machine of the character described including a horizontally disposed, rotatable bead forming brush, means for supporting a plurality of article forms in front of the brush with the articles in contact therewith and rotating the forms, and means for reciprocating the forms and brush vertically with relation to each other.

3. A machine of the character described including a horizontally disposed, rotatable bead forming brush, means for rotatably supporting a plurality of article forms in front of the brush with the articles in contact therewith and rotating the forms, and means for moving the brush vertically with relation to the forms and article thereon.

4. A machine of the character described including a horizontally disposed, rotatable bead forming brush, means for supporting a plurality of article forms in front of the brush with the articles in contact therewith and rotating the forms, and constantly operated means for causing a vertical reciprocation of the brush.

5. A machine of the character described including a horizontally disposed, rotatable bead forming brush, means for supporting an article form in front of the brush with the article in contact therewith and rotating the form, constantly operated means for causing a vertical reciprocation of the brush including a brush support, vertical guides therefor, and constantly driven means operatively engaging the brush support for vertically reciprocating the brush support and the brush.

6. A machine of the character described including a horizontally disposed, rotatable bead forming brush, means for supporting an article form in front of the brush with the article in contact therewith and rotating the form, constantly operated means for causing a vertical reciprocation of the brush including a brush support, vertical guides upon which the brush support is mounted, the weight of the brush support causing it to move downward upon said guides, a drive shaft, and cams mounted upon the drive shaft and operatively engaging said support to cause its vertical reciprocation.

7. A machine of the character described including a horizontally disposed, rotatable bead-forming brush, means for rotatably supporting a plurality of article forms in front of the brush with the articles in contact therewith, means for rotating the article forms while the articles are in contact with the brush, and means for relatively moving the forms and brush vertically with relation to each other.

8. A machine of the character described including a horizontally disposed, rotatable bead-forming brush, means for rotatably supporting an article form in front of the brush with the article in contact therewith, means for rotating the form while the article is in contact with the brush including a horizontally disposed wheel adapted to have rotative engagement with the form when the article on the form has been moved into contact with the brush, means for constantly driving said wheel, and means for vertically reciprocating the bead-forming brush.

9. A machine of the character described including a horizontally disposed, rotatable bead-forming brush mounted for vertical movement, means for vertically reciprocating said brush, a series of form-driving gears disposed below the brush, means for constantly driving said gears, and means whereby a series of forms may be simultaneously and manually presented to bring the bases of said forms into rotative engagement with the gears and the articles on said forms in engagement with the brush.

10. A machine of the character described including a supporting frame, a horizontally disposed, constantly rotated brush mounted upon the supporting frame for vertical movement, means for vertically reciprocating said brush, a series of form-driving gear wheels mounted upon said frame immediately below the brush, means for constantly driving said gear wheels, and means for supporting a form board having thereon a series of rotatable forms upon said frame so that the bases of the forms may be brought in rotative engagement with the driving gears and the articles upon said forms be brought in operative engagement with the brush.

11. A machine of the character described including a supporting frame, a horizontally disposed, rotatable bead-forming brush, means for constantly rotating said brush, means for reciprocating said brush, a series of gear wheels mounted below the brush and extending parallel thereto, means for constantly rotating said gear wheels, and a form-supporting board having thereon a series of rotatable forms, each form adapted to support an article to be engaged by the brush, each form having a portion thereof adapted to be operatively engaged by said corresponding driving gear wheel to thereby rotate the form when the board is shifted into position to bring the series of forms into engagement with the gear wheels and the articles on the forms into engagement with the brush.

12. A machine of the character described including a supporting frame, vertical guides mounted upon the frame and carrying pulleys at their upper ends, a brush-supporting member having rollers at its ends engaging said guides, cables attached to the brush-supporting member and extending over said pulleys and having counter-balancing weights, brackets extending from the supporting member, a rotatable bead-forming brush having a shaft supported in said brackets, means whereby the shaft may be driven, lift rods attached to the roller support and extending downward below the same, a cam shaft, cams mounted upon the shaft for engaging said lift rods, a series of gear wheels mounted in line below the brush at spaced intervals, means for rotating said gear wheels as the brush is rotated, the gear wheels rotating in a plane at right angles to the plane of rotation of the brush, a form support having a series of pins, and forms mounted upon said pins, each of said forms having a base portion formed to be rotatably engaged by a gear wheel when the form support is so disposed as to bring the article on the form into contact with the brush, the gear wheels being so spaced apart that each gear wheel rotatably engages two of the forms.

13. In a machine of the character described, a supporting frame forming a table upon which a form support may be disposed, vertical guides extending upward from the table, a supporting member slidable upon said guides, means for reciprocating said supporting member, a longitudinally extending brush carried by the supporting member and having a shaft, means for constantly rotating said shaft, the brush being disposed above said table, a series of gear wheels disposed in a horizontal plane in line below said brush, means for rotating said gear wheels as the brush is rotated and reciprocated, a form support having a length approximately equal to that of the brush and having a plurality of upwardly extending pins, article forms rotatably mounted upon said pins, each of the article forms having a portion thereof adapted to form a gear wheel and have operative engagement with the first named gear wheels when the article on the form has been brought in contact with the brush, each of said forms being formed with a circumferential groove in its base, and a member mounted upon the form support engaging in said grooves and preventing upward movement of the forms but permitting rotation thereof.

14. In a machine of the character described, a supporting frame forming a table upon which a form support may be disposed, vertical guides extending upward from the table, a supporting member slidable upon said guides, means for reciprocating said supporting member, a longitudinally extending brush carried by the supporting member and having a shaft, means for constantly rotating said shaft, the brush being disposed above said table, a series of gear wheels disposed in a horizontal plane in line below said brush, means for rotating said gear wheels as the brush is rotated and reciprocated including a longitudinally extending worm shaft, a worm gear mounted upon the shaft of said gear wheels and engaging the worm shaft and rotating the same, a form support having a length approximately equal to that of the brush and having a plurality of upwardly extending pins, article forms rotatably mounted upon said pins, each of the article forms having a portion thereof adapted to form a gear wheel and have operative engagement with the first named gear wheels when the article on the form has been brought in contact with the brush, each of said forms being formed with a circumferential groove in its base, and a member mounted upon the form support engaging in said grooves and preventing upward movement of the forms but permitting rotation thereof.

15. A machine of the character described including a form supporting board having two parallel rows of upwardly extending pins, gear wheels loosely mounted for rotation upon the pins and having upwardly extending dowels, and forms detachably and rotatably mounted upon said pins and resting upon the gear wheels and having recesses within which the dowels of the gear wheels engage whereby the forms may be removed from the pins and gear wheels or readily replaced.

16. A machine of the character described including a form supporting board having an upwardly extending row of fixed pins, gear wheels loosely mounted for rotation upon the pins and having upwardly extending dowels, forms rotatably and detachably mounted upon said pins and resting upon said gear wheels and having recesses within which the dowels engage whereby the forms may be removed from the pins and gear wheels or readily replaced, the forms being formed with circumferential shoulders, and a member being mounted above said board engaging over said shoulders on all of the forms to hold the forms in place with the dowels on the gear wheels in engagement with the forms.

17. A mechanism of the character described, including a rotatable bead forming brush, means for constantly rotating said brush, means for rotatably supporting an article form in front of the brush, said means permitting the article form to be shifted toward or from the axis of the brush in a direction at right angles thereto, means for vertically reciprocating the brush, and means for applying rotative power to the form simultaneously with its contact with the brush.

18. A mechanism of the character described, including a rotatable constantly driven bead forming brush, means for rotatably supporting an article form in front of the brush, said means permitting the article form to be shifted toward or from the axis of the brush in a direction at right angles thereto, means for relatively reciprocating the brush and form, a constantly driven driving element disposed below the brush, and means for bringing the article form into operative engagement with the driving element, simultaneously with the contact of said form with said brush.

19. A mechanism of the character described, including a rotatable constantly driven bead forming brush, means for rotatably supporting an article form and including a gear wheel, said means permitting the article form to be shifted toward or from the axis of the brush in a direction at right angles thereto, means for relatively reciprocating the brush and form in a direction parallel to the length of the form, and a constantly driven driving member disposed below the brush with which the gear wheel of the form supporting means is adapted to be engaged simultaneously with the engagement of the form with the brush.

In testimony whereof I hereunto affix my signature.

CLIFFORD A. PIERCE.